(12) United States Patent
Sano

(10) Patent No.: US 7,665,496 B2
(45) Date of Patent: Feb. 23, 2010

(54) PNEUMATIC TIRE

(75) Inventor: Masahiro Sano, Nagoya (JP)

(73) Assignee: Bridgestone Corporation, Tokyo (JP)

( * ) Notice: Subject to any disclaimer, the term of this patent is extended or adjusted under 35 U.S.C. 154(b) by 25 days.

(21) Appl. No.: 10/500,191

(22) PCT Filed: Dec. 26, 2002

(86) PCT No.: PCT/JP02/13622

§ 371 (c)(1),
(2), (4) Date: Jun. 25, 2004

(87) PCT Pub. No.: WO03/055700

PCT Pub. Date: Jul. 10, 2003

(65) Prior Publication Data

US 2005/0081975 A1   Apr. 21, 2005

(30) Foreign Application Priority Data

Dec. 26, 2001   (JP) .............................. 2001-395043

(51) Int. Cl.
*B60C 13/02*   (2006.01)
(52) U.S. Cl. ..................... 152/523; D12/605
(58) Field of Classification Search ................. 152/523; D12/605
See application file for complete search history.

(56) References Cited

U.S. PATENT DOCUMENTS

| | | | |
|---|---|---|---|
| D204,585 S * | 4/1966 | Vizina | D12/605 |
| 4,198,774 A * | 4/1980 | Roberts et al. | 152/523 |
| 4,823,856 A | 4/1989 | Roberts | |
| 5,303,758 A | 4/1994 | Clementz | |
| 5,645,660 A * | 7/1997 | Attinello et al. | 152/523 |
| 5,807,446 A * | 9/1998 | Ratliff, Jr. | 152/523 |
| 6,053,228 A * | 4/2000 | Baker | 152/523 |
| 6,832,638 B2 * | 12/2004 | Oyama | 152/523 |
| 2002/0174928 A1* | 11/2002 | Ratliff, Jr. | 152/555 |
| 2003/0084979 A1* | 5/2003 | Matsumoto | 152/523 |

FOREIGN PATENT DOCUMENTS

| | | |
|---|---|---|
| EP | 0 490 247 A1 | 6/1992 |
| EP | 0 751 014 A2 | 1/1997 |
| JP | 6-6967 Y2 | 2/1994 |
| JP | 6-340208 A | 12/1994 |
| JP | 09-011713 | 1/1997 |
| JP | 10-067209 A * | 3/1998 |
| JP | 2000-255224 A | 9/2000 |
| WO | WO 97/17217 A1 | 5/1997 |
| WO | WO 00/09348 A1 | 2/2000 |

OTHER PUBLICATIONS

International Search Report.

* cited by examiner

*Primary Examiner*—Geoffrey L Knable
(74) *Attorney, Agent, or Firm*—Sughrue Mion, PLLC

(57) ABSTRACT

On a region of a ring-shaped continuous decorative portion 15 formed of tops and bottoms in cross-section, protruding portions 17 higher than the decorative portion 15 and having a predetermined surface area are provided. A joined portion of the decorative portion 15 and each protruding portion 17 or of the protruding portions is set higher than the bottoms of the decorative portion 15, and a rigidity difference between the protruding portions 17 and the decorative portion 15 is resolved, thus restricting an occurrence of a stress concentration.

9 Claims, 5 Drawing Sheets

PNEUMATIC TIRE

TECHNICAL FIELD

This invention relates to a pneumatic tire contributing to durability of a region of a display portion provided on a sidewall.

BACKGROUND ART

In general, on a sidewall of a pneumatic tire, a variety of characters, numbers and graphics (hereinafter, referred to as a display portion) are provided in order to meet legal criteria of the respective countries around the world.

When the display portion is provided, from a viewpoint of improving an exterior appearance of the product, for example, as shown in FIG. 1, display portions 103 are sometimes provided on an area of a decorative portion 101 in which ring-shaped longitudinal ridges having cross sections composed of crests and roots are applied, that is, so-called serrations are cut.

The display portions 103 are higher than the decorative portion 101 and have a shape in which each upper surface 105 has a large surface area when being enlarged as shown in FIG. 2.

As apparent from FIG. 2, rigidity of the display portions 103 provided on the sidewall becomes larger as compared with that of the decorative portion 101 in terms of a relationship in cross-sectional area therebetween. Accordingly, a rigidity difference occurs between each display portion 103 and the decorative portion 101 through a root groove 107.

The rigidity difference becomes a factor to cause a stress concentration in the root groove 107 as a boundary between the display portion 103 and the decorative portion 101 due to an influence of a load applied repeatedly when the tire runs. In particular, in a region of the decorative portion 101 sandwiched between the display portion 103 and the display portion 103, which have high rigidity, the rigidity difference becomes noticeable.

When the stress concentration occurs repeatedly in the root groove 107, such an occurrence is prone to lead to a crack due to flex fatigue of the root groove 107, causing a problem that durability of a region of the display portions is greatly affected.

Note that, as a document of the prior art related to this application, the following is given.

Japanese Patent Laid-Open No. H6-340208 (published in 1994)

DISCLOSURE OF THE INVENTION

This invention has an object to provide a pneumatic tire achieving an improvement of durability in a manner that a rigidity difference is made not to occur between a decorative portion and a display portion.

In order to achieve the foregoing object, this invention is a pneumatic tire including a cylindrical crown portion, and a pair of sidewalls and a pair of bead portions, the sidewalls and the bead portions being continuous from both sides of the crown portion, in which a decorative portion having tops and bottoms continue with each other thereon is arranged on at least one of the sidewalls. This pneumatic tire is characterized in that protruding portions higher than the tops of the decorative portion are provided, and joined portions of the protruding portion and decorative portion and/or of the protruding portions are higher than the bottoms of the decorative portion.

The rigidity difference is resolved, and thus the occurrence of the stress concentration is decreased, and it is made possible to restrict the crack caused by the flex fatigue for a long period of time without damaging the exterior appearance. As a result of this, the durability of the region of the protruding portions is improved to a great extent.

Moreover, in a preferred embodiment, a high decorative portion having bottoms higher than the bottoms of the decorative portion and the tops continue with each other thereon may be provided on the joined portion of the protruding portions.

In such a way, even if pluralities of the bottoms and tops continue between the protruding portion and the protruding portion, a large rigidity difference does not occur owing to the high decorative portion, and the flex fatigue can be restricted from occurring concentratedly on one part. Therefore, the occurrence of the crack can be securely restricted for a long period of time without damaging the exterior appearance.

Moreover, another aspect of this invention is a pneumatic tire including a cylindrical crown portion, and a pair of sidewalls and a pair of bead portions, the sidewalls and the bead portions being continuous from both sides of the crown portion, in which a decorative portion having tops and bottoms continue with each other thereon is arranged on at least one of the sidewalls, characterized in that protruding portions higher than the tops of the decorative portion are provided, and flat portions higher than the bottoms of the decorative portion are provided on bottoms between the protruding portions adjacent to each other.

In such a way, corner portions where the stress concentration is prone to occur are removed, and thus the occurrence of the crack caused by the flex fatigue can be securely restricted.

Moreover, in a preferred embodiment, it is preferable that a ratio of a width of each of the flat portions be 40 to 70% with respect to a width between ends of top surfaces of the protruding portions.

The reason is as follows. When the ratio of the width of the flat portion is lower than 40% with respect to the width between the ends of the top surfaces of the protruding portions, the exterior appearance is damaged, and in addition, the flex fatigue concentrates on one part, and the occurrence of the crack cannot be restricted.

Moreover, a corner region connecting the decorative portion and each protruding portion may be formed of a round portion. This is because the crack can be prevented from occurring, which may be caused by a concentration of the flex fatigue on one part.

It is preferable that the round portion have a radius of 0.2 to 1.0 mm.

Moreover, it is preferable that a height of the joined portion of the protruding portion and the decorative portion or of the protruding portions be set within a range of 30% to 70% with respect to a height to each top surface of the protruding portions. The reason is as follows. When the ratio of the height of the joined portion is lower than 30%, though the tire is satisfactory in the exterior appearance, the crack cannot be prevented from occurring, which may be caused by the concentration of the flex fatigue. Furthermore, when the ratio of the height of the joined portion is higher than 70%, though the flex fatigue can be prevented from concentrating, the tire is inferior in the exterior appearance.

BEST MODE FOR CARRYING OUT THE INVENTION

Figure 3:
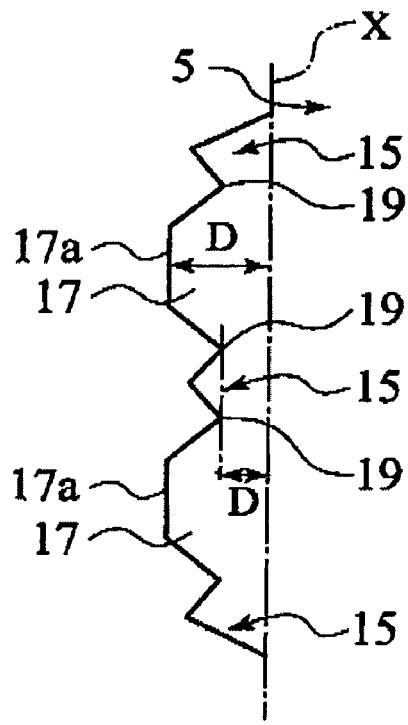
FIG. 3. is a cross-sectional explanatory view schematically showing an enlarged portion of a pneumatic tire according to a first embodiment of this invention.

A first embodiment of this invention will be concretely described below while referring to FIG. 3 to FIG. 5.

Figure 5:
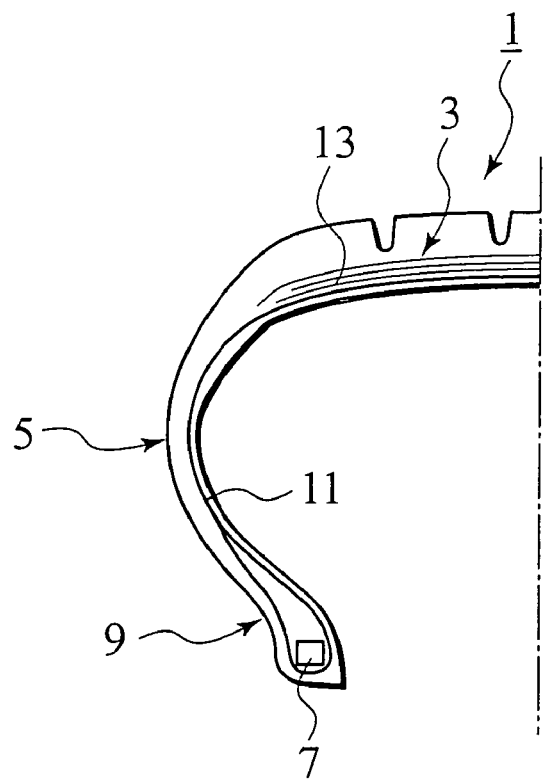
FIG. 5 is a cross-sectional explanatory view schematically showing a left half of the pneumatic tire according to the first embodiment of this invention.

FIG. 5 shows a schematic cross-sectional view of a pneumatic safety tire 1. The pneumatic safety tire 1 includes sidewalls 5 continuous from both ends constituting a cylindrical crown portion 3 toward an inside in a diameter direction, bead portions 9 in which bead rings 7 are embedded in tip portions, a carcass layer 11 disposed from one of the sidewalls 5 through the crown portion 3 to the other sidewall (not shown), both ends of the carcass layer 11 being wound around and fixed to the bead rings 7, and a belt layer 13 made of a plurality of unstretchable belts arranged over a region of the crown portion 3 and stacked on the carcass layer 11.

Figure 4:
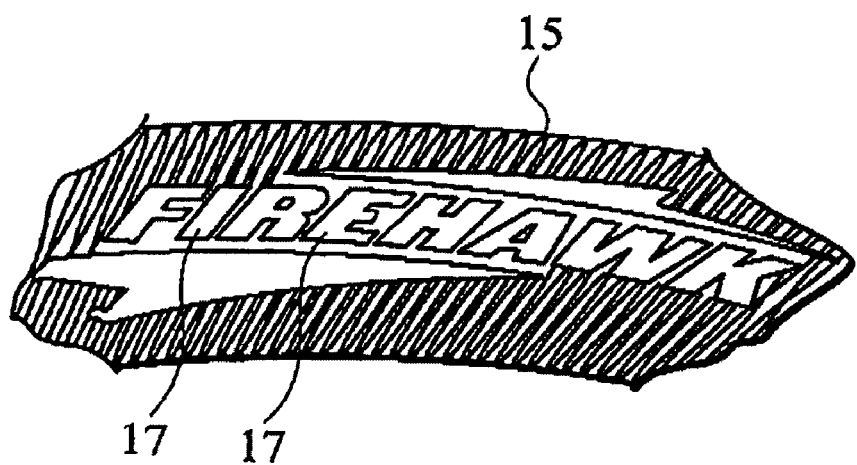
FIG. 4 is a schematic explanatory view of one part in which protruding portions becoming display portions are provided on a region of a decorative portion of a sidewall in the first embodiment of this invention.

Meanwhile, on the sidewall 5, a continuous decorative portion 15 in which serrations are cut such that cross-sectional tops and bottoms continue with each other as shown in FIG. 4 is arranged in a ring shape in a state of being tilted to some extent. Thus, an improvement of appearance of the tire is achieved.

On a region of the decorative portion 15, display portions 17 becoming protruding portions made of a combination of characters, marks and the like are provided. Note that the decorative portion 15 in which the serrations are cut not only achieves the improvement of appearance. The decorative portion 15 also includes a function to restrict a bare state by allowing air to pass between the tops and the bottoms during a vulcanization process. In the vulcanization process, a green tire having been molded is put into a metal mold, the tire is inflated to a shape of the metal mold by pressurization from an inner surface thereof, the tire is heated from the inner and outer surfaces thereof, and thus a tire product is manufactured.

The display portions 17 are formed into a large cross-sectional shape higher than the decorative portion 15 and having a predetermined surface area.

Bottoms 19 of joined portions composed of tops and bottoms between the display portion 17 and the display portion 17, and bottoms 19 of joined portions of the decorative portion 15 and display portion 17, are set at positions higher than the bottoms of the decorative portion 15 and formed into a shape in which V grooves become wide and shallow.

In the bottom surfaces 19 of the joined portions, a ratio of a height DB from a root groove line X connecting the bottoms of the decorative portion 15 with respect to a height DA to top surfaces 17a of the display portions 17 is set at 30 to 70%, and preferably, 50 to 70%. As the height DB of the bottoms 19 becomes higher, a difference of elevation between the bottoms 19 and the top surfaces 17a is decreased, and thus it becomes difficult to recognize outer circumferential edge lines of the display portions 17. Consequently, a display function as display portions is lowered. Accordingly, from a viewpoint of the display function and the rigidity, it is preferable to set a ratio relationship between the height DA of the display portions 17 and the height DB of the bottoms 19 at approximately 2:1 by setting the height DB at approximately a half of the height DA.

Moreover, it is preferable to form the bottoms 19 into a round shape in which corners are removed.

According to the pneumatic tire 1 thus constituted, though the tire 1 comes to be repeatedly subjected to compressive strain in the region of the display portions 17 while running, a large rigidity difference between the display portion 17 and the decorative portion 15 or between the display portion 17 and the display portion 17 is resolved. In addition, the strength and rigidity of the region concerned are enhanced, and an occurrence of a stress concentration is decreased. As a result of this, it is made possible to securely restrict a crack caused by flex fatigue for a long period of time without damaging the exterior appearance, leading to that durability of the region of the display portions 17 is improved to a great extent.

Figure 6:
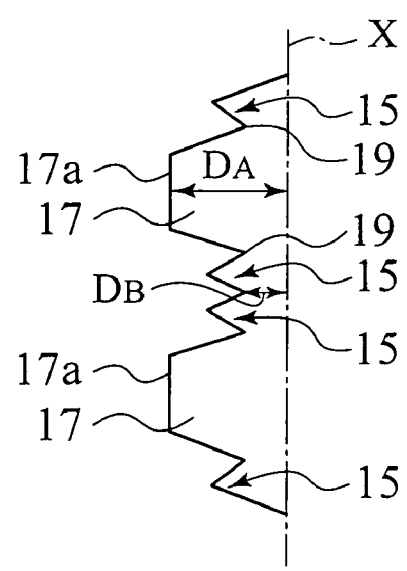
FIG. 6 is a cross-sectional explanatory view similar to FIG. 3, showing a modification example of the first embodiment of this invention, in which a high joined portion composed of pluralities of continuous bottoms and tops is provided between a display portion and a display portion, both becoming the protruding portions.

Note that, as shown in FIG. 6, in an embodiment in which the decorative portion 15 having pluralities of the tops and bottoms continuing with each other are provided between the display portion 17 and the display portion 17, means may be adopted as illustrated, in which a high decorative portion 15A having bottoms higher than the bottoms of the decorative portion 15 and the tops continue with each other is provided. In such a way, similar operation and effect to those shown in FIG. 3 can be expected.

Figure 7:
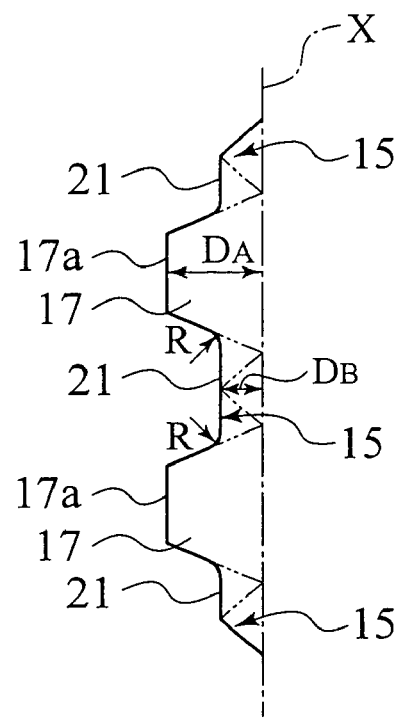
FIG. 7 is a cross-sectional explanatory view schematically showing a pneumatic tire according to a second embodiment of this invention, in which joined portions of the display portion and display portion, both becoming the protruding portions, and of the display portion and decorative portion are made as flat portions.

FIG. 7 is one showing a second embodiment of the joined portion.

Specifically, in this embodiment, the joined portions of the decorative portion 15 and display portion 17 and of the display portion 17 and display portion 17 are formed into a shape integrally continuous in flat portions 21 higher than the bottoms of the decorative portion 15.

In the flat portions 21, a ratio of a height DB from a root groove line X connecting a root groove and root groove (two-dotted lines) of the decorative portion 15 is set at 30% to 70%, and preferably, 50% to 70% with respect to a height DA to the top surfaces 17a of the display portions 17. As the height DB of the flat portions 21 becomes higher, a difference of elevation between the flat portions 21 and the top surfaces 17a is decreased, and thus it becomes difficult to recognize the outer circumferential edge lines of the display portions 17.

As a result of this, the display function as display portions is lowered. Accordingly, from a viewpoint of the display function and the rigidity, it is preferable to set a ratio relationship between the height DA of the display portions 17 and the height DB of the flat portions 21 at approximately 2:1 by setting the height DB at approximately a half of the height DA.

Meanwhile, corner portions of the flat portions 21 and display portions 17 are formed as round portions with a radius of 0.2 mm to 1.0 mm, in which sharp corners are removed. In this case, the round portions with a radius of approximately 0.6 mm are preferable.

Hence, according to this second embodiment, though the tire 1 comes to be repeatedly subjected to compressive strain in the region of the display portions 17 while running, the rigidity difference is resolved by the flat portions 21. In addition, the V grooves are eliminated, and therefore, the strength and rigidity of the region concerned are enhanced to a great extent, and the occurrence of the stress concentration is decreased. As a result of this, it is made possible to securely restrict the crack caused by the flex fatigue for a long period of time without damaging the exterior appearance.

Next, a third embodiment of the present invention will be described by use of FIG. 8 to FIG. 10.

Figure 8:
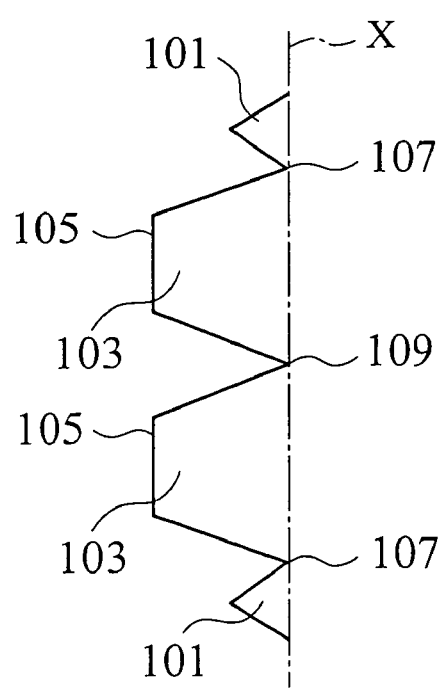
FIG. 8 is a cross-sectional explanatory view showing a case where the protruding portions are adjacent to each other in Conventional example.

FIG. 8 shows a case where display portions 103 are directly adjacent to each other without interposing a decorative portion 101 therebetween in Conventional example. A V-shaped root groove 109 is formed between the display portions 103. A height of this root groove 109 becomes the same as that of a root groove line X connecting the display portions 103 and the decorative portion 101. Therefore, the stress concentration becomes prone to occur in the root groove 109.

Figure 9:
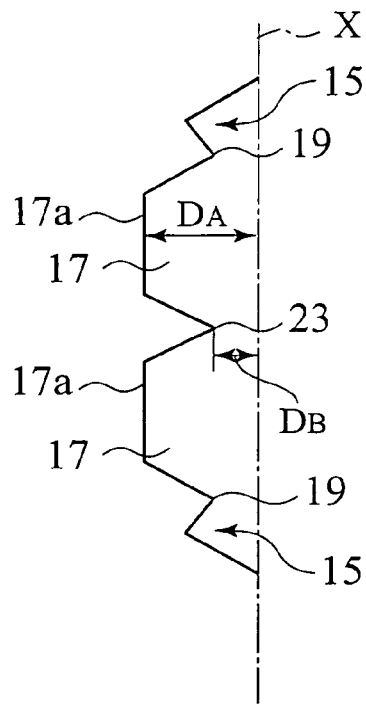
FIG. 9 is a cross-sectional explanatory view schematically showing a pneumatic tire according to a third embodiment of this invention, showing an example where the joined portion of the protruding portions is formed high.

In the third embodiment of the present invention, as shown in FIG. 9, the display portions 17 are directly adjacent to each other without interposing the decorative portion 15 therebetween. A bottom 23 of the joined portion of the display portions 17 and the bottoms 19 of the joined portions of the display portions 17 and the decorative portion 15 are set at positions higher than the bottoms of the decorative portion 15 and formed into a shape in which V grooves become wide and shallow. With regard to the bottom 23 of the joined portion, a ratio of a height DB from a root groove line X connecting the bottoms of the decorative portion 15 with respect to a height DA to the top surfaces 17a of the display portions 17 is set at 30% to 70%, and preferably, 50% to 70%.

Figure 10:
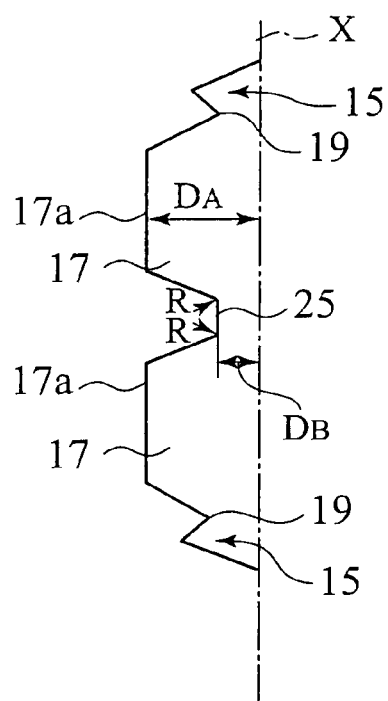
FIG. 10 is a cross-sectional explanatory view schematically showing the pneumatic tire according to the third embodiment of this invention, showing an example where a flat portion is formed on the joined portion of the protruding portions.

In FIG. 10, the joined portion of the display portion 17 and display portion 17 is formed of a flat portion 25 higher than the bottoms of the decorative portion 15. With regard to the flat portion 25, a ratio of a height DB from a root groove line X connecting the root groove and root groove of the decorative portion 15 with respect to a height DA to the top surfaces 17a of the display portions 17 is set at 30% to 70%, and preferably, 50% to 70%.

Corner portions of the flat portions 25 and display portions 17 are formed as round portions with a radius of 0.2 mm to 1.0 mm, in which sharp corners are removed. In this case, the round portions with a radius of approximately 0.6 mm are preferable.

This third embodiment also has effects similar to those of the aforementioned first and second embodiments.

Next, test results are shown in Table 1. In this test, the height of the joined portions was variously changed, and the test was performed under conditions where the height of the protruding portions was 6 mm and the radius of the corner regions was 0.6 mm.

TABLE 1

|  | Conventional example | Embodiment 1 | Embodiment 2 | Embodiment 3 | Comparative example 1 | Comparative example 2 |
|---|---|---|---|---|---|---|
| Height of joined portions (%) | 0 | 30 | 50 | 70 | 28 | 73 |
| Number of cracks* (pieces) | 5 | 1 | 1 | 1 | 3 | 1 |
| Length of maximum crack occurred (mm) | 62.7 | 7.5 | 4.6 | 3.5 | 15.6 | 2.3 |
| Depth of maximum cross-sectional crack (mm) | 3.6 | 0.9 | 0.7 | 0.6 | 2.5 | 0.2 |
| Exterior appearance/ Visibility | ○ | ○ | ○ | ○ | ○ | Δ |

*Number of spots where cracks occur on circumference

Figure 1:
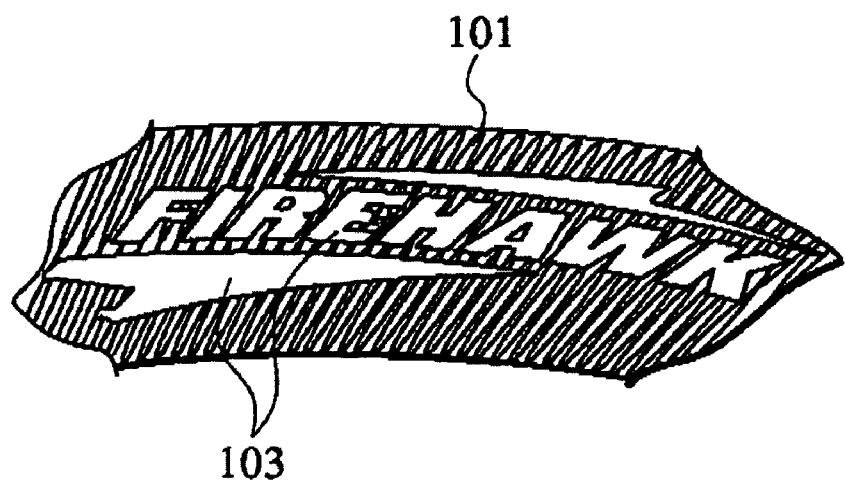
FIG. 1 is a schematic explanatory view showing a conventional example.

The test of which results were shown in FIG. 1 was performed concretely based on the following conditions.

Test condition: Long run drum test performed outdoors at low inner pressure
Running distance: 30000 km
Size of sample tire: 185/60R14
Size of used rim: 5.5Jx14
Inner pressure: 100 kPa In Table 1, in the case of Conventional example where the height of the joined portions was the same as that of the root groove line X, though the tire was excellent in the exterior appearance, the tire was inferior in all of the number of spots where the cracks occurred, the length of the maximum crack occurred and the depth of the maximum cross-sectional crack. Meanwhile, in the case of Comparative example 1 where the ratio (DB/DA) of the height of the joined portions was set at 28%, though the tire was satisfactory in the exterior appearance, as in the case of Conventional example, the tire was inferior in all of the number of spots where the cracks occurred, the length of the maximum crack occurred and the depth of the maximum cross-sectional crack. Moreover, in the case of Comparative example 2 where the ratio (DB/DA) of the height of the joined portion was set at 73%, though the tire was excellent in the number of spots where the cracks occurred, the length of the maximum crack occurred and the depth of the maximum cross-sectional crack, the tire was inferior in the exterior appearance.

On the other hand, in the cases of Embodiment 1, Embodiment 2 and Embodiment 3 where the ratio (DB/DA) of the height of the joined portion was set at 30%, 50% and 70%, respectively, the tires were excellent in all of the number of spots where the cracks occurred, the length of the maximum crack occurred, the depth of the maximum cross-sectional crack and the exterior appearance. Hence, it is preferable to set the height of the joined portion at 30% to 70%.

Figure 2:
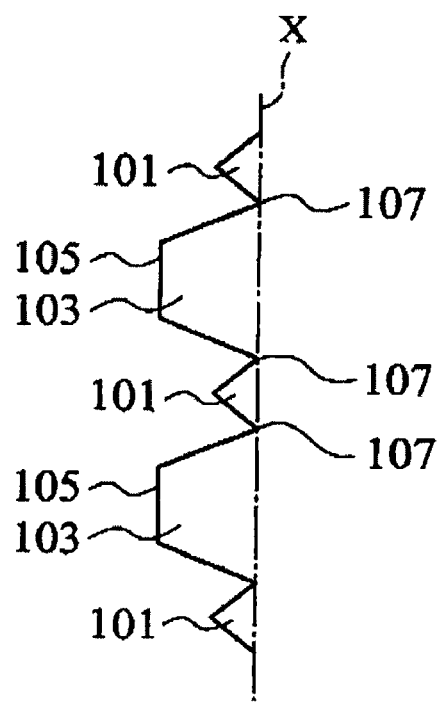
FIG. 2. is a cross-sectional explanatory view schematically showing an enlarged portion 1.

Next, results of a test which was performed by variously changing the radius (mm) of the corner region are shown in FIG. 2. Other conditions are the same for Embodiment 2, that is, the ratio of the height of the joined portions is 50% with respect to the height DA, and the height of the protrusions is 6 mm.

TABLE 2

|  | Comparative example 3 | Embodiment 4 | Embodiment 5 | Comparative example 4 |
| --- | --- | --- | --- | --- |
| Radius of corner region (mm) | 0.1 | 0.2 | 1.0 | 1.1 |
| Number of cracks* (pieces) | 2 | 1 | 1 | 1 |
| Length of maximum crack occurred (mm) | 11.5 | 6.0 | 3.0 | 2.0 |
| Depth of maximum cross-sectional crack (mm) | 1.1 | 0.8 | 0.5 | 0.3 |
| Exterior appearance/ Visibility | ◯ | ◯ | ◯ | Δ |

*Number of spots where cracks occur on circumference

In Table 2, in the case of Comparative example 3 where the radius of the corner region was set at 0.1 mm, though the tire was excellent in the exterior appearance, the tire was inferior in all of the number of spots where the cracks occurred, the length of the maximum crack occurred and the depth of the maximum cross-sectional crack. Meanwhile, in the case of Comparative example 4 where the radius of the corner region was set at 1.1 mm, though the tire was excellent in the number of spots where the cracks occurred, the length of the maximum crack occurred and the depth of the maximum cross-sectional crack, the tire was inferior in the exterior appearance.

On the other hand, in the cases of Embodiment 4 and Embodiment 5 where the radius of the corner region was set at 0.2 mm and 1.0 mm, respectively, the tire was excellent in all of the number of spots where the cracks occurred, the length of the maximum crack occurred, the depth of the maximum cross-sectional crack and the exterior appearance. Hence, it is preferable to set the radius of the corner region at 0.2 mm to 1.0 mm.

Figure 11:
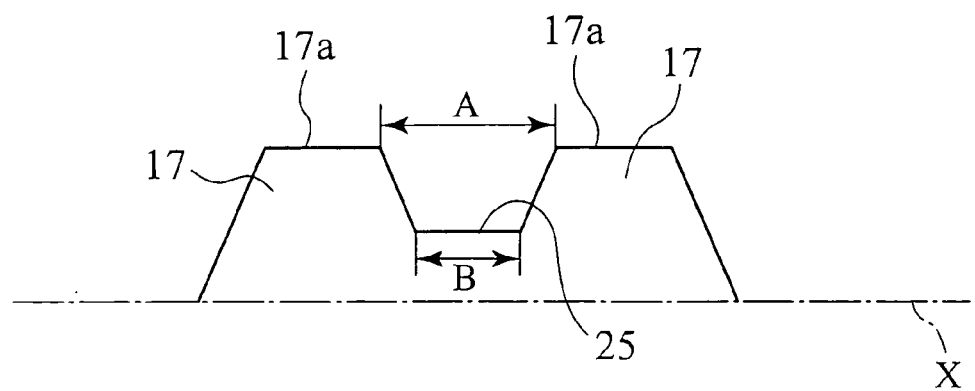
FIG. 11 is a cross-sectional explanatory view schematically showing a relationship between a width between top surfaces of the protrusions and a width of the flat portion in the third embodiment of this invention.

Next, results of a test which was performed by variously changing the width of the flat portion are shown in Table 3. As shown in FIG. 11, a ratio (B/A %) of the width of the flat portion is represented as a ratio of a width B of the flat portion 25 to a width A between the top surfaces 17a of the protruding portions 17. Note that the test was performed under the condition where a ratio (height percent of the joined portion) of the height of the flat portion was set at 50%.

TABLE 3

|  | Comparative example 5 | Embodiment 6 | Embodiment 7 | Embodiment 8 | Comparative example 6 |
| --- | --- | --- | --- | --- | --- |
| Width of flat portion (%) | 30 | 40 | 50 | 70 | 0.8 |
| Number of cracks* (pieces) | 1 | 1 | 1 | 1 | 3 |
| Length of maximum crack occurred (mm) | 2.3 | 3.8 | 4.6 | 7.0 | 13.4 |
| Depth of maximum cross-sectional crack (mm) | 0.2 | 0.4 | 0.7 | 1.4 | 2.3 |
| Exterior appearance/ Visibility | Δ | ◯ | ◯ | ◯ | ◯ |

*Number of spots where cracks occur on circumference

As shown in Table 3, in the case of Comparative example 5 where the ratio of the width of the flat portion was set at 30%, though the tire was excellent in the number of spots where the cracks occurred, the length of the maximum crack occurred and the depth of the maximum cross-sectional crack, the tire was inferior in the exterior appearance. Moreover, in the case of Comparative example 6 where the ratio of the width of the flat portion was set at 0.8%, though the tire was excellent in the exterior appearance, the tire was inferior in all of the number of spots where the cracks occurred, the length of the maximum crack occurred and the depth of the maximum cross-sectional crack.

On the other hand, in the cases of Embodiment 6, Embodiment 7 and Embodiment 8 where the width of the flat portion was set at 40%, 50% and 70%, respectively, the tires were excellent in all of the number of spots where the cracks occurred, the length of the maximum crack occurred, the depth of the maximum cross-sectional crack and the exterior appearance. Hence, it is preferable to set the width of the flat portion at 40% to 70%.

INDUSTRIAL APPLICABILITY

According to this invention, the rigidity difference between the protruding portion and the decorative portion or between the protruding portions is resolved by the joined portions higher than the bottoms of the decorative portion. Thus, the occurrence of the stress concentration is decreased. In addition, the crack caused by the flex fatigue can be securely restricted for a long period of time without damaging the exterior appearance. As a result of this, the durability of the region of the protruding portions is improved to a great extent.

The invention claimed is:

1. A pneumatic tire comprising a cylindrical crown portion, and a pair of sidewalls and a pair of bead portions, the sidewalls and the bead portions being continuous from both sides of the crown portion, in which a continuous decorative portion and protruding portions are arranged on at least one of the sidewalls, wherein the continuous decorative portion comprises serrations having a pattern of tops and bottoms which continue with each other, the tops of the serrations protruding higher than the bottoms of the serrations with respect to a direction of protruding from the sidewall on which the decorative portion is arranged, and the tops and bottoms of the serrations extend continuously along the length thereof from a first region to a second region, wherein the bottoms of the serrations in the first region are formed at a root groove line, wherein the protruding portions protrude higher than the tops of the serrations with respect to the direction of protruding from the sidewall, the protruding portions including at least one of a character and a mark, and wherein each protruding portion adjoins the serrations at the second region of the serrations to provide a joined portion around the protruding portion, wherein bottoms of the adjoined serrations in the second region at the joined portion are higher than the root groove line defined by the bottoms of the same adjoined serrations in the first region with respect to the direction of protruding from the sidewall.

2. The pneumatic tire according to claim 1, further comprising a high decorative including serrations having a pattern of tops and bottom that is provided between the protruding portions, wherein the protruding portions adjoin the high decorative portion at joined portions of the respective protruding portions, and the bottoms of the high decorative portions are higher than the root groove line with respect to the direction of protruding from the sidewall.

3. The pneumatic tire according to any one of claims 1 or 2, wherein a height from the root groove line to the bottoms of the joined portion that is provided around the protruding portion is set within a range of 30% to 70% with respect to a height from the root groove line to each top surface of the protruding portions.

4. The pneumatic tire according to claim 1, wherein the protruding portions comprise a group of letters.

5. A pneumatic tire comprising a cylindrical crown portion, and a pair of sidewalls and a pair of bead portions, the sidewalls and the bead portions being continuous from both sides of the crown portion, in which a continuous decorative portion and protruding portions are arranged on at least one of the sidewalls, wherein the continuous decorative portion comprises serrations having a pattern of tops and bottoms which continue with each other, the tops of the serrations protruding higher than the bottoms of the serrations with respect to a direction of protruding from the sidewall on which the decorative portion is arranged, and the tops and bottoms of the serrations extend continuously along the length thereof from a first region to a second region, wherein the bottoms of the serrations in the first region are formed at a root groove line, wherein the protruding portions protrude higher than the tops of the serrations with respect to the direction of protruding from the sidewall, and wherein each protruding portion adjoins the serrations at the second region of the serrations to provide a joined portion around the protruding portion, wherein bottoms of the adjoined serrations in the second region at the joined portion are higher than the root groove line defined by the bottoms of the same adjoined serrations in the first region with respect to the direction of protruding from the sidewall;

wherein a flat portion continuously extends between one of the protruding portions and another of the protruding portion, and the flat portion is higher than the root groove line with respect to the direction of protruding from the sidewall;

wherein each of the protruding portions forms a character, respectively, and the flat portion is formed between the characters.

6. The pneumatic tire according to claim 5, wherein a ratio of a width of the flat portion is 40 to 70% with respect to a width between ends of top surfaces of the protruding portions.

7. The pneumatic tire according to claim 5, wherein a corner region connecting the flat portion and each protruding portion is formed of a round portion.

8. The pneumatic tire according to claim 7, wherein the round portion has a radius of 0.2 to 1.0 mm.

9. The pneumatic tire according to claim 5, wherein the protruding portions comprise a group of letters.

* * * * *